US012230466B2

(12) United States Patent
Kim et al.

(10) Patent No.: US 12,230,466 B2
(45) Date of Patent: Feb. 18, 2025

(54) EARTHING SWITCH

(71) Applicant: Hyundai Electric & Energy Systems Co., Ltd., Seoul (KR)

(72) Inventors: Keon Woo Kim, Seoul (KR); Ji Hoon Kim, Seoul (KR); Seung Hwan Baik, Seoul (KR)

(73) Assignee: Hyundai Electric & Energy Systems Co., Ltd., Seoul (KR)

( * ) Notice: Subject to any disclaimer, the term of this patent is extended or adjusted under 35 U.S.C. 154(b) by 110 days.

(21) Appl. No.: 18/177,943

(22) Filed: Mar. 3, 2023

(65) Prior Publication Data

US 2024/0296999 A1 Sep. 5, 2024

(51) Int. Cl.
*H01H 9/12* (2006.01)
*H01H 25/00* (2006.01)
*H01H 33/56* (2006.01)
*H01H 33/70* (2006.01)

(52) U.S. Cl.
CPC ............ *H01H 9/12* (2013.01); *H01H 25/002* (2013.01); *H01H 33/56* (2013.01); *H01H 33/7038* (2013.01)

(58) Field of Classification Search
CPC ........ H01H 9/12; H01H 25/002; H01H 33/56; H01H 33/7038; H01H 31/003; H01H 33/125; H01H 33/70; H01H 33/77; H01H 33/91; H01H 25/00; H02B 13/075
USPC .......................................... 218/12–13, 51–60
See application file for complete search history.

(56) References Cited

U.S. PATENT DOCUMENTS

| | | | | |
|---|---|---|---|---|
| 12,057,278 | B2 * | 8/2024 | Sato | H01H 33/91 |
| 2005/0189326 | A1 | 9/2005 | Moser et al. | |
| 2008/0203346 | A1 | 8/2008 | Shu | |
| 2012/0061352 | A1 | 3/2012 | Shimizu et al. | |
| 2013/0020286 | A1 | 1/2013 | Yeon et al. | |
| 2017/0236657 | A1 | 8/2017 | Kim | |
| 2019/0362917 | A1 | 11/2019 | Monka et al. | |
| 2021/0074496 | A1 * | 3/2021 | Ishikawa | H01H 33/56 |

(Continued)

FOREIGN PATENT DOCUMENTS

| | | | |
|---|---|---|---|
| CN | 106384961 | B | 7/2018 |
| EP | 0665565 | A | 8/1995 |

(Continued)

OTHER PUBLICATIONS

Korean Search Report for corresponding Application No. 10-2021-0148747, dated May 4, 2022, 10 pages.

(Continued)

*Primary Examiner* — Lheiren Mae A Caroc
(74) *Attorney, Agent, or Firm* — Dority & Manning, P.A.

(57) ABSTRACT

An earthing switch includes a fixed contact part fixed in an enclosure, a movable contact part disposed to face the fixed contact part, having a hollow portion formed therein, and having one end portion connected to a driving device and driven by the driving device so that the other end portion thereof is connected to or separated from the fixed contact part, and a piston part located in the hollow portion and moving relative to the movable contact part, wherein the hollow portion extends in a longitudinal direction of the movable contact part, both end portions of the hollow portion in the longitudinal direction are formed to be open, and the piston part includes a gas flow path formed therein.

13 Claims, 4 Drawing Sheets

(56) References Cited

U.S. PATENT DOCUMENTS

| | | | | |
|---|---|---|---|---|
| 2021/0082644 | A1* | 3/2021 | Kotsuji | H01H 33/7023 |
| 2021/0320481 | A1 | 10/2021 | Kim et al. | |

FOREIGN PATENT DOCUMENTS

| | | | |
|---|---|---|---|
| EP | 3477675 | A | 5/2019 |
| JP | H05053094 | U | 7/1993 |
| JP | H08329800 | A | 12/1996 |
| JP | 4522490 | B1 | 8/2010 |
| JP | 2018098128 | A | 6/2018 |
| KR | 101919125 | B1 | 11/2018 |
| KR | 102135381 | B1 | 7/2020 |
| WO | WO2018114204 | A | 6/2018 |

OTHER PUBLICATIONS

European Search Report for corresponding Application No. EP23160179, dated Sep. 11, 2023, 5 pages.
Saudi Arabian Examination Report for corresponding Application No. 123446598, dated Jul. 15, 2024, 10 pages.

* cited by examiner

-Prior Art-

EARTHING SWITCH

BACKGROUND

1. Field

The present disclosure relates to an earthing switch capable of ensuring sufficient switching performance regardless of a type of insulating gas.

2. Description of Related Art

Gas Insulated Switchgears (GISs) are power switchgears used in indoor and outdoor power plants or substations and include a main bus, a disconnecting switch (DS), an earthing switch (ES), a current transformer (CT), a bushing (gas to air bushing), a control box, etc.

Here, the earthing switch is a kind of switch that is important for an operation of power equipment, which earths an electric path to the ground when the electric path is examined and repaired. The earthing switch is generally provided together with a driving device for driving the earthing switch so that the earthing operation is performed by driving the driving device.

FIG. 1 illustrates an example of an earthing switch according to the related art. A conductor 9 is coupled to an insulation spacer installed in an enclosure 1 and a fixed contact part 10 is coupled to the conductor, so that the fixed contact part is installed inside the enclosure. A movable contact part 20' connected to a ground terminal 3 is disposed above the fixed contact part, and the movable contact part is moved up and down to be brought into contact with and separated from the fixed contact part, thereby switching a contact point.

Meanwhile, as $SF_6$ (sulfur hexafluoride) gas used as an insulating gas in a gas insulated switchgear has been classified as a representative greenhouse gas, a gas insulated switchgear that does not use SF6 gas has been required. Accordingly, a gas insulated switchgear using eco-friendly gases has been developed to replace the SF6 gas.

When an eco-friendly gas replacing $SF_6$ gas, a gas mixture of approximately 5 mol % of heptafluoroisobutyronitrile ($(CF_3)_2CFCN$) and 95 mol % of carbon dioxide ($CO_2$), for example, was applied to the earthing switch according to the related art of FIG. 1, an arc was not extinguished in the earthing switch of the related art having a configuration shown in FIG. 1 even if the gas mixture exceeded 100 ms, confirming that the earthing switch of the related art has very insufficient switching performance or lacks such performance.

As such, since insulation characteristics of the eco-friendly gases are only ⅓ or less compared to the $SF_6$ gas, there is a problem in that switching performance varies depending on the type of the insulating gas in the earthing switch described above.

SUMMARY

An aspect of the present disclosure may provide an earthing switch capable of ensuring sufficient switching performance regardless of a type of insulating gas.

According to an aspect of the present disclosure, an earthing switch may include: a fixed contact part fixed in an enclosure; a movable contact part disposed to face the fixed contact part, having a hollow portion formed therein, and having one end portion connected to a driving device and driven by the driving device so that the other end portion thereof is connected to or separated from the fixed contact part; and a piston part located in the hollow portion and moving relative to the movable contact part, wherein the hollow portion extends in a longitudinal direction of the movable contact part, both end portions of the hollow portion in the longitudinal direction are formed to be open, and the piston part includes a gas flow path formed therein.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

Figure 1:
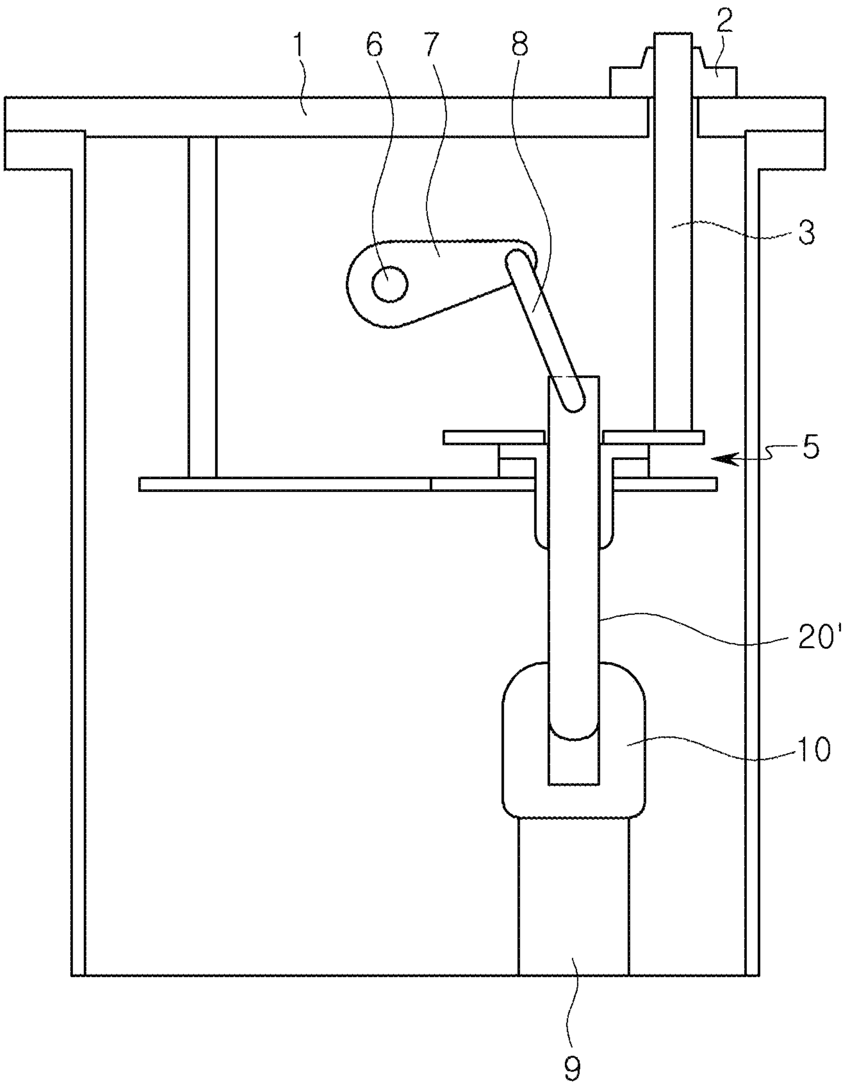
FIG. 1 is a view illustrating a closed state of an earthing switch according to the prior art.
Figure 2:
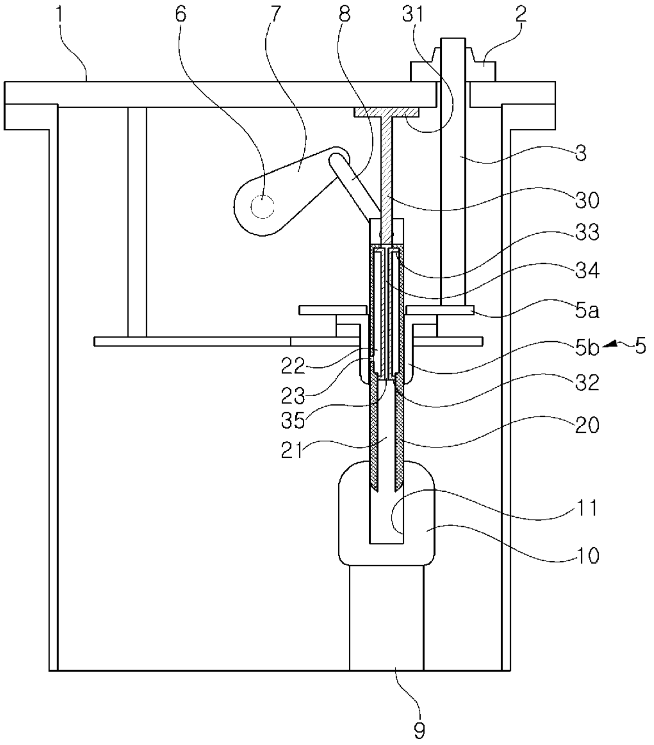
FIG. 2 is a view illustrating a closed state of an earthing switch according to a first exemplary embodiment in the present disclosure.
Figure 3:
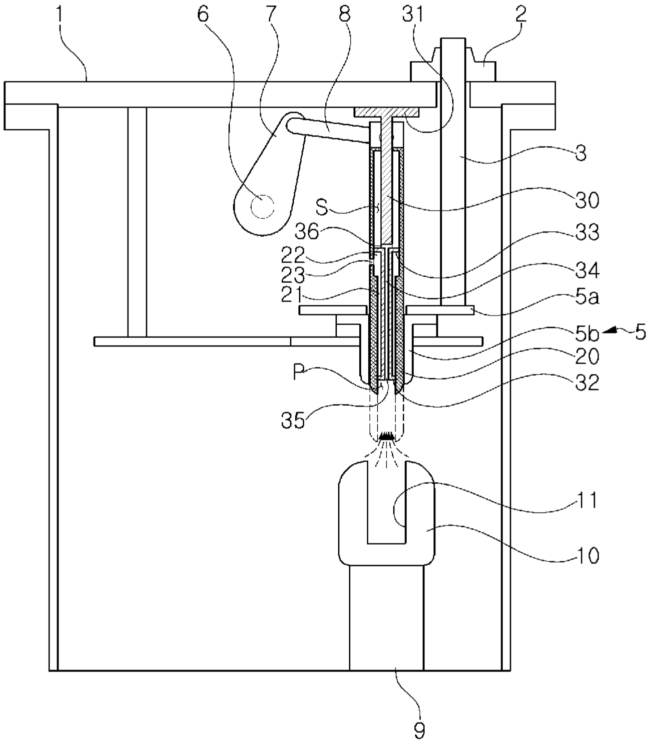
FIG. 3 is a cross-sectional view illustrating an open state of an earthing switch according to the first exemplary embodiment in the present disclosure shown in FIG. 2.

FIG. 2 is a view illustrating a closed state of an earthing switch according to a first exemplary embodiment in the present disclosure, and FIG. 3 is a cross-sectional view illustrating an open state of an earthing switch according to the first exemplary embodiment in the present disclosure shown in FIG. 2.

For example, the earthing switch according to the first exemplary embodiment in the present disclosure may be installed in an enclosure 1 of a gas insulated switchgear.

The enclosure 1 is filled with insulating gas having insulating power therein, and a ground terminal 3 may be disposed on one side of the enclosure. The ground terminal is formed to be elongated, and one end protrudes to the outside of the enclosure and the other end may be coupled to a housing 5 fixedly mounted inside the enclosure.

Here, as the insulating gas, at least one of a gas mixture of approximately 5 mol % of heptafluoroisobutyronitrile ($(CF_3)_2CFCN$) and 95 mol % of carbon dioxide ($CO_2$) or dry air may be used, for example.

An insulating member 2 is interposed between the enclosure 1 and the ground terminal 3 to insulate the enclosure and the ground terminal.

The housing 5 includes a flange portion 5*a* fixedly coupled to an end portion of the ground terminal 3 and a body portion 5*b* extending from the flange portion, and a movable contact part 20 passes through the body portion and is installed to reciprocate.

The housing 5 may be formed of a conductive material, such as metal, so that the ground terminal 3 and the movable contact part 20 are conducted with each other.

In the enclosure 1, a driving device (not shown) is installed, and a main shaft 6 performing rotating movement is connected to the driving device for generating driving force by an operator's operation. The driving device may include a lever for a manual operation or a motor for an electrical operation.

One side of a first link 7 is fixedly mounted on the main shaft 6. One end of a second link 8 is rotatably connected to the other side of the first link, and the other end of the second link may be rotatably connected to one end portion of the movable contact part 20. At least one of the first link and the second link is preferably formed of an insulating material.

Meanwhile, an insulation spacer (not shown) is installed in the enclosure 1, and a conductor 9 is coupled to the insulation spacer. By coupling a fixed contact part 10 to the conductor, the fixed contact part may be installed to be located inside the enclosure.

As shown in FIGS. 2 and 3, the earthing switch according to the first exemplary embodiment in the present disclosure may include the fixed contact part 10, the movable contact part 20, and a piston part 30.

As described above, the fixed contact part 10 is installed to be fixed to the conductor 9 inside the enclosure 1, and an opening groove 11 open to one side may be formed.

The movable contact part 20 is installed to reciprocate through the body portion 5*b* of the housing 5 inside the enclosure 1, and may be disposed in series to face the fixed contact part 10. One end portion of the movable contact part may be connected to a driving device (not shown) via the second link 8, the first link 7, and the main shaft 6 to receive driving force.

The other end portion of the movable contact part 20 may be inserted into the opening groove 11 of the fixed contact part 10. When the end portion of the movable contact part is inserted into the opening groove, the movable contact part may contact the fixed contact part and be physically and electrically connected. Thus, the movable contact part and the fixed contact part may be conducted.

Conversely, when the end portion of the movable contact part 20 come out of the opening groove 11 of the fixed contact part 10 and are separated from each other, the electrical connection between the movable contact part and the fixed contact part is released, and thus, conduction between the movable contact part and the fixed contact part may be interrupted.

In the earthing switch according to the first exemplary embodiment in the present disclosure, hollow portions 21 and 22 are provided inside the movable contact part 20 so that the movable contact part may be formed as a substantially tubular member. The hollow portion may extend in a longitudinal direction of the movable contact part, and both end portions of the hollow portion in the longitudinal direction may be formed to be open.

Optionally, the hollow portion may be classified as a first hollow portion 21 disposed to be adjacent to the opening groove 11 of the fixed contact part 10 and a second hollow portion 22 disposed to be adjacent to the second link 8 and communicating with the first hollow portion.

In addition, at least one ventilation hole 23 may be formed in a sidewall of the movable contact part 20, so that the outside of the movable contact part and the hollow portion, for example, the second hollow portion 22, of the movable contact part may communicate with each other.

The second hollow portion 22 may have an inner diameter greater than an inner diameter of the first hollow portion 21, but is not necessarily limited thereto.

The earthing switch according to the first exemplary embodiment in the present disclosure may include a piston part 30 fixed to the enclosure 1, is located in the hollow portions 21 and 22 of the movable contact part 20, and moves relatively with respect to the movable contact part reciprocating by driving force of the driving device.

The piston part 30 is a substantially rod-shaped member, and has one end provided with a support portion 31 to be mounted on a member fixed to the enclosure 1 or the inside of the enclosure and the other end provided with a first extension 32 extending laterally to airtightly contact the hollow portion of the movable contact part 20, for example, an internal surface of the first hollow portion 21.

In addition, a second extension 33 extending laterally is formed between the support portion 31 and the first extension 32 in the piston part 30 to airtightly contact the hollow portion of the movable contact part 20, for example, the internal surface of the second hollow portion 22.

For example, when the inner diameters of the first hollow portion 21 and the second hollow portion 22 of the movable contact part 20 are different from each other, the lengths of the first extension 32 and the second extension 33 of the piston part 30 extending laterally may be formed to be different from each other.

In addition, a gas flow path 34 may be formed to extend in a longitudinal direction of the piston part from the first extension 32 to the second extension 33 inside the piston part 30. One side of the gas flow path communicates with a first through-hole 35 in the center of the first extension, and the other side thereof passes through the second extension and communicates with at least one second through-hole 36 (see FIG. 2) open to the side of the piston part 30.

The piston part 30 may at least partially include polytetrafluoroethylene (PTFE) or a material in which PTFE and a metal are combined.

For example, at least the first extension 32 and the second extension 33 may be formed of PTFE for airtight contact with the internal surface of the hollow portion of the movable contact part 20 and smooth movement and lubrication at the same time. In addition, in order to secure an elastic section for preventing permanent deformation of the piston part, at least a portion of the piston part 30 or the support portion 31 may be formed of PTFE or a material as a combination of PTFE and metal.

When the movable contact part 20 reciprocates by driving force of the driving device, the first extension 32 and the second extension 33 of the piston part 30 may relatively move in the longitudinal direction of the movable contact part and the hollow portion in the first hollow portion 21 and the second hollow portion 22.

At this time, there is a relationship of 1:1 to 0.7 between an inner diameter of the movable contact part 20, that is, a diameter of the first hollow portion 21, and an outer diameter of the first extension 32 of the piston part 30. In addition, there is a relationship of 1:1 to 0.7 between a diameter of the second hollow portion 22 in the movable contact part 20 and an outer diameter of the second extension 33 of the piston part 30.

When the movable contact part and the fixed contact part are separated and the piston part relatively moves with respect to the movable contact part, an insulating gas should not move into a gap between the inner diameter of the movable contact part 20 and the outer diameter of the extensions 32 and 33.

For example, if the ratio between the inner diameter of the movable contact part 20 and the outer diameter of the extensions 32 and 33 is less than 1:0.7, an insulating gas may flow to the gap between the inner diameter of the movable contact part 20 and the outer diameter of the extensions 32 and 33 and there is a high possibility that the insulating gas may not be suctioned through a gas flow path 34.

As such, the insulating gas should not be moved to the gap between the inner diameter of the movable contact part 20 and the outer diameter of the extensions 32 and 33, so that the insulating gas may be effectively circulated around the contacts to recover breaking performance.

As the movable contact part 20 moves relative to the piston part 30 and the extensions 32 and 33 located in the hollow portions 21 and 22 thereof, a suction chamber S (see FIG. 2) may be formed by an inner wall of an end portion of the movable contact part and the second extension 33 in the second hollow portion 22. The suction chamber may communicate with the gas flow path 34 inside the piston part.

As the movable contact part 20 moves relative to the piston part 30 and a volume of the suction chamber S is changed, the insulating gas may be suctioned through the gas flow path 34 in a space P partitioned by the first hollow portion 21 of the movable contact part and the first extension 32 of the piston part.

Meanwhile, when the movable contact part 20 moves relative to the piston part 30 and the extensions 32 and 33 located in the hollow portions 21 and 22 thereof, the gas in the space partitioned by the second hollow portion 22 and the first extension 32 and the second extension 33 may move toward the first hollow portion 21 and may be discharged to the outside of the movable contact part through the ventilation hole 23, or conversely, external gas may be introduced into the second hollow portion. Accordingly, pressure in the space may be maintained in equilibrium with the outside of the movable contact part.

In addition, as the movable contact part 20 moves relative to the piston part 30 and the extensions 32 and 33 located in the hollow portions 21 and 22 thereof, the movable contact part may be guided in a movement path thereof by the piston part, and accordingly, linear movability of the movable contact part may be improved.

Due to this, displacement of the movable contact part 20 during movement may be prevented, and, for example, foreign matter occurring when the movable contact part contacts or collides with other components therearound may be reduced.

Hereinafter, the operation and effect of the earthing switch according to the first exemplary embodiment in the present disclosure will be described.

First, when an operator operates the driving device (not shown), the main shaft 6 is rotated by the driving device, and the first link 7 connected to the main shaft rotates about the main shaft, for example, in a clockwise direction in the drawing.

As the first link 7 rotates, the second link 8, one end of which is connected to the first link, moves downwardly in the drawing, for example, and the movable contact part 20 connected to the other end of the second link moves downwardly and is connected to the fixed contact part 10.

Accordingly, as shown in FIG. 2, the earthing switch is placed in a closed state, and current may be conducted from the ground terminal 3 to the conductor 9 in the enclosure 1.

When the operator reversely operates the driving device, the main shaft 6 is rotated in a reverse direction by the driving device, and the first link 7 connected to the main shaft rotates about the main shaft, for example, in a counterclockwise direction in the drawing.

As the first link 7 rotates in the reverse direction, the second link 8, one end of which is connected to the first link, moves upwardly in the drawing, for example, and the movable contact part 20 connected to the other end of the second link also moves upwardly, so that the connection of the movable contact part 20 to the fixed contact part 10 is released.

As shown in FIG. 3, by moving the movable contact part 20 in a direction away from the fixed contact part 10, the earthing switch is placed in an open state. At this time, not only the fixed contact part but also the piston part 30 does not move, and only the movable contact part may move in the longitudinal direction.

When the movable contact part 20 and the fixed contact part 10 are separated from each other in this manner, an arc is generated between the movable contact part and the fixed contact part. At the same time, high-temperature insulating gas heated by the arc may flow into the space P partitioned by the first hollow portion 21 of the movable contact part 20 and the first extension 32 of the piston part 30.

As the movable contact part 20 moves relative to the piston part 30 and the extensions 32 and 33 located in the hollow portions 21 and 22 thereof, the suction chamber S partitioned by the inner wall of the other end of the movable contact part and the second extension 33 may be formed in the second hollow portion 22.

Since the suction chamber S has a relatively low pressure compared to the outside of the movable contact part 20, the high-temperature insulating gas in the space P may be suctioned into the suction chamber by way of the second through-hole 36 through the gas flow path 34 of the piston part 30.

Subsequently, when the movable contact part 20 moves farther from the fixed contact part 10, a volume of the space P in the movable contact part is reduced by the piston part 30, but a volume of the suction chamber S on the opposite side increases and pressure significantly decreases, so that the insulating gas flows more rapidly toward the second hollow portion 22 of the movable contact part and a flow or circulation of the insulating gas is created around the space.

Figure 4:
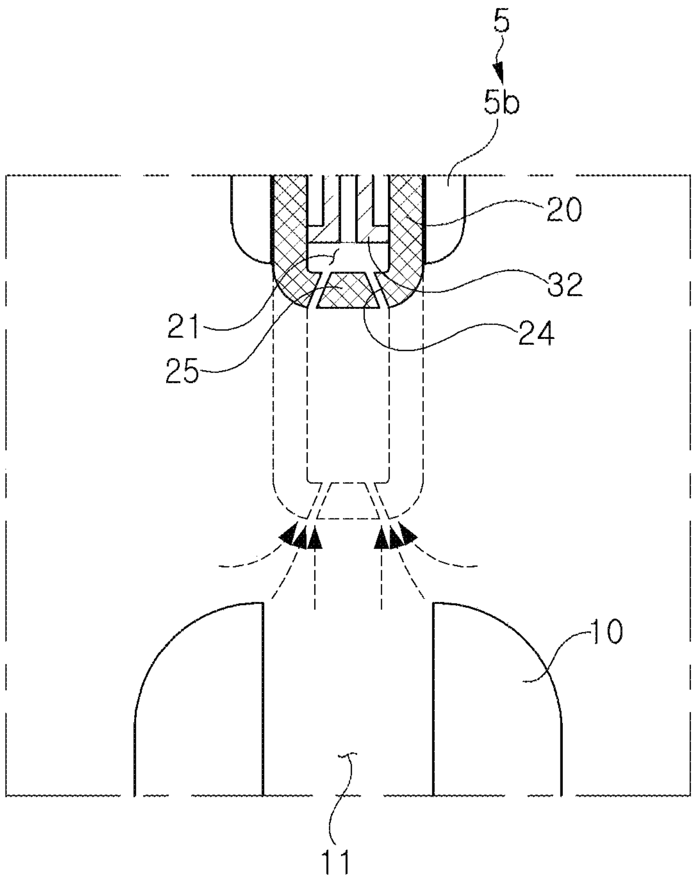
FIG. 4 is a cross-sectional view of main parts of an earthing switch according to a second exemplary embodiment in the present disclosure in an open state.

FIG. 4 is a cross-sectional view of main parts of an earthing switch according to a second exemplary embodiment in the present disclosure in an open state.

In the second exemplary embodiment in the present disclosure, only the structure of the other end of the movable contact part 20 is different, and the rest of the components are the same as those of the first exemplary embodiment described above. Therefore, in describing the earthing switch according to the second exemplary embodiment in the present disclosure, the same reference numerals are given to the same components as those of the earthing switch according to the first exemplary embodiment described above, and detailed descriptions of the configurations and functions will be omitted.

In the earthing switch according to the second exemplary embodiment in the present disclosure, the hollow portions 21 and 22 are provided inside the movable contact part 20 so that the movable contact part may be formed as a substantially tubular member. The hollow portions may extend in the longitudinal direction of the movable contact part, and both end portions of the hollow portions in the longitudinal direction may be formed to be open.

Here, a wall portion 25 separating the first hollow portion 21 and the outside may be formed at the other end of the movable contact part 20, and at least one through-hole 24 may be formed in the wall portion 25. The through-hole has a diameter smaller than the inner diameter of the movable contact part in the first hollow portion.

For example, there is a relationship of 1:0.008 to 0.2 between a cross-sectional area of the inner diameter of the movable contact part 20, that is, the diameter of the first hollow portion 21, and a cross-sectional area of the through-hole 24 or the sum of the cross-sectional areas of the plurality of through-holes 24. It is preferable to have an appropriate area ratio between the inner diameter of the movable contact part and the through-hole in consideration of the operation of the device and recovery of breaking performance.

Due to the through-hole 24, the high-temperature insulating gas heated by an arc may be introduced into the space P partitioned by the first hollow portion 21 of the movable contact part 20 and the first extension 32 of the piston part 30, and the insulating gas may gradually flow to circulate advantageously toward arc extinguishing.

In FIG. 4, it can be seen that a plurality of through-holes 24 are formed in an oblique direction inclined with respect to the longitudinal direction of the hollow portions 21 and 22 and the movable contact part 20.

As described above, in the earthing switch according to the present disclosure, when the movable contact part and the fixed contact part are separated, the piston part moves relative to the movable contact part to cause suction for the insulating gas in the first hollow portion to be suctioned into the suction chamber formed in the second hollow portion, so that breaking performance of the insulating gas around the contacts may be recovered regardless of the type of insulating gas and switching performance of the earthing switch may be improved.

In addition, in the earthing switch according to the present disclosure, since the insulating gas heated by the arc may flow into the second hollow portion from the first hollow portion of the movable contact part, the high-temperature insulating gas may not stay and flow between the contacts, and accordingly, there is an advantage in that safety and durability of the earthing switch are excellent.

In addition, according to the earthing switch according to the present disclosure, the movable contact part provided with the hollow portion and the piston part provided with the gas flow path may perform the role of a suction cylinder without adding a separate suction cylinder, thereby simplifying the structure of the earthing switch and it is possible to reduce manufacturing cost and maintain stable operating characteristics.

Therefore, in the earthing switch according to the present disclosure, an advantage in that switching performance may be sufficiently secured regardless of the type of insulating gas is obtained.

In addition, according to the present disclosure, since the movable contact part is configured to be relatively movable along the piston part located in the hollow portion, the linear movability of the movable contact part may be improved, thereby reducing the occurrence of foreign matter.

While exemplary embodiments have been shown and described above, it will be apparent to those skilled in the art that modifications and variations could be made without departing from the scope of the present disclosure as defined by the appended claims.

What is claimed is:

1. An earthing switch comprising:

a fixed contact part fixed in an enclosure;

a movable contact part disposed to face the fixed contact part, having a hollow portion formed therein, and having one end portion connected to a driving device and driven by the driving device so that an other end portion thereof is connected to or separated from the fixed contact part; and a piston part located in the hollow portion and moving relative to the movable contact part, wherein the hollow portion extends in a longitudinal direction of the movable contact part, both end portions of the hollow portion in the longitudinal direction are formed to be open, and the piston part includes a gas flow path formed therein.

2. The earthing switch of claim 1, wherein an opening groove formed to be open to one side is formed in the fixed contact part, and the other end portion of the movable contact part is insertable into the opening groove.

3. The earthing switch of claim 2, wherein the hollow portion includes a first hollow portion disposed to be adjacent to the opening groove and a second hollow portion communicating with the first hollow portion.

4. The earthing switch of claim 3, wherein the piston part includes a support portion formed at one end thereof and mounted inside of the enclosure, a first extension extending laterally is formed at an other end thereof to contact an internal surface of the first hollow portion, and a second extension extending laterally is formed between the support portion and the first extension and contacts an internal surface of the second hollow portion.

5. The earthing switch of claim 4, wherein the piston part at least partially includes polytetrafluoroethylene (PTFE) or a material in which PTFE and a metal are combined.

6. The earthing switch of claim 4, wherein the gas flow path extends in a longitudinal direction of the piston part from the first extension to the second extension inside the piston part, and one side of the gas flow path communicates with a first through-hole in the first extension, and an other side thereof passes through the second extension and communicates with at least one second through-hole opened laterally in the piston part.

7. The earthing switch of claim 6, wherein, when the movable contact part and the fixed contact part are separated from each other, the piston part moves relative to the movable contact part to form a suction chamber partitioned by the second extension and an inner wall of the movable contact part in the second hollow portion and cause suction for an insulating gas in the first hollow portion to be suctioned through the gas flow path.

8. The earthing switch of claim 4, wherein a ratio between a diameter of the first hollow portion and an outer diameter of the first extension of the piston part is 1:1 to 0.7, and a ratio between a diameter of the second hollow portion and an outer diameter of the second extension of the piston part is 1:1 to 0.7.

9. The earthing switch of claim 3, wherein at least one ventilation hole is formed in a sidewall of the movable contact part, so that an outside of the movable contact part communicates with the second hollow portion.

10. The earthing switch of claim 3, wherein the second hollow portion has an inner diameter larger than an inner diameter of the first hollow portion.

11. The earthing switch of claim 1, wherein a wall portion separating the hollow portion and an external portion the outside is formed at the other end portion of the movable contact part, and at least one through-hole is formed in the wall portion.

12. The earthing switch of claim 11, wherein a plurality of through-holes are formed in an oblique direction inclined with respect to a longitudinal direction of the movable contact part.

13. The earthing switch of claim 1, wherein an inside of the enclosure is filled with an insulating gas, and the insulating gas includes at least one of a gas mixture of heptafluoroisobutyronitrile ((CF3)2CFCN) and carbon dioxide (CO2), or dry air.

* * * * *